(12) United States Patent
Itakura et al.

(10) Patent No.: US 6,402,991 B1
(45) Date of Patent: Jun. 11, 2002

(54) SHAPED ARTICLE MADE OF FUNCTIONAL MATERIAL

(75) Inventors: Kiyoshi Itakura, 2-31-2, Maihama, Urayasu city, Tiba prefecture, 279-0031, Urayasu; Keiichiro Matsushita, Soka, both of (JP)

(73) Assignees: TNK Co., Ltd., Nagoya; Japan Entech Co., Ltd., Soka; Kiyoshi Itakura, Urayasu, all of (JP)

( * ) Notice: Subject to any disclaimer, the term of this patent is extended or adjusted under 35 U.S.C. 154(b) by 0 days.

(21) Appl. No.: 09/425,222

(22) Filed: Oct. 22, 1999

(30) Foreign Application Priority Data

Oct. 23, 1998 (JP) .............................. 10-349233

(51) Int. Cl.[7] .............................................. C04B 35/10
(52) U.S. Cl. ....................... 252/500; 252/508; 252/512; 252/514; 252/518.1; 252/519.5; 252/520.3; 501/127; 501/128
(58) Field of Search ................................ 252/500, 508, 252/512, 514, 518.1, 519.5, 520.3; 501/127, 128

(56) References Cited

U.S. PATENT DOCUMENTS 5,419,855 A * 5/1995 Kikuta ....................... 252/587

FOREIGN PATENT DOCUMENTS

| CN | 1053050 | * | 7/1991 |
| CN | 1053784 | * | 8/1991 |
| JP | 62184088 | * | 8/1987 |
| JP | 03250088 | * | 11/1991 |
| JP | 10114573 | * | 5/1998 |
| JP | 10297961 | * | 11/1998 |

* cited by examiner

*Primary Examiner*—Paul Marcantoni
(74) *Attorney, Agent, or Firm*—Oblon, Spivak, McClelland, Maier & Neustadt, P.C.

(57) ABSTRACT

The function of a functional material is enhanced by kneading a metallic powder, a metallic compound, or a functional mineral powder with a far-IR-radiating ceramic composition into a shape suitable for the application. A shaped article of a function-enhanced ceramic is obtained by kneading a powder of a far-IR-radiating material comprising a ceramic composition containing 52.5–70 wt % $SiO_2$ and 20–47 wt % $Al_2O_3$ in an amount of 30 wt % or more and a metallic powder, a metallic compound, or a functional mineral powder; shaping and drying the mixture; and firing.

15 Claims, 1 Drawing Sheet

SHAPED ARTICLE MADE OF FUNCTIONAL MATERIAL

BACKGROUND OF THE INVENTION

1. Field of the Invention

The present invention relates to a shaped article made of a functional material. The shaped article is produced by mixing powder of functional material such as a metallic powder, a metallic compound, or a functional mineral with a ceramic composition which radiates far-infrared light with high intensity (hereinafter simply referred to as a "far-IR-radiating ceramic composition") serving as a shaping material; and shaping and firing the mixture. More particularly, the invention relates to a shaped article made of a functional material which provides an enhanced functional effect of the functional material due to emission at room temperature of far-IR light from the ceramic composition, in order to contribute toward promoting health of the human body, purifying water, sterilizing objects by killing bacteria, and improving air quality.

2. Description of the Related Art

Conventionally, ceramic materials have been known to have a far-IR-radiating characteristic, and a variety of far-IR-radiating materials making use of such a characteristic have been produced. For example, the present inventors have developed a ceramic composition which exhibits remarkably high emission of far-IR at room temperature (Japanese Patent No. 1822582). The patented ceramic, comprising 52.5–70 wt % $SiO_2$ and 20–47 wt % $Al_2O_3$, has high mechanical strength in practice and radiates far-IR light at room temperature. There is ever-increasing demand not only for far-IR radiation, but also for radiation of negative ions, an effect of a negatively polarized electrode, an antibacterial effect, and a deodorizing effect based on adsorption. In order to meet such a demand, the following metallic powders, metallic compounds, and minerals are now on the market: quartz-schist, monazite, and tourmaline serving as negative ion-radiating materials; a piezoelectric substance, tourmaline ore, and monazite for providing negative microelectrodes; silver ion-substituted ceramics, silver microparticles, and a piezoelectric substance for obtaining antibacterial effects; and minerals having a microporous surface such as activated alumina and a piezoelectric substance for obtaining deodorizing effects based on their absorption mechanism.

However, a naturally-occurring mineral exhibiting a particular function cannot be used in the form of crushed particles, and use of a metal or a metallic compound in powder form or in the form of particles is also limited. Thus, in practice, such a mineral is preferably formed into a shape such as a ball or a plate. Since shaping of the above materials without use of an additive is difficult and in some cases such shaping is economically disadvantageous, the material are shaped by use of a binder or an extender; e.g., resin or clay.

SUMMARY OF THE INVENTION

In view of the foregoing, the present inventors have performed research and have found that a shaped article obtained from the above-described far-IR-radiating ceramic composition and a functional material powder exhibits a remarkable function that is particularly effective for improving the quality of water or a liquid organic substance, such as an oil, due to the far-IR radiation effect.

Accordingly, the present invention provides a function-enhanced shaped ceramic article, which article is obtained by mixing a powder of a functional material of at least one species selected from among a mineral, a metal, and a metallic compound, and a powder of a far-IR-radiating material-comprising a ceramic composition containing 52.5–70 wt % $SiO_2$ and 20–47 wt % $Al_2O_3$; shaping the mixture; and firing.

Preferably, the powder of a far-IR-radiating material is incorporated into the mixture in. an amount of 30 wt % or more and 90 wt % or less.

Preferably, the functional material is formed of at least one species selected from among quartz-schist, monazite, tourmaline, a piezoelectric substance, a silver ion-substituted substance, silver microparticles, a copper- or zinc-ion-substituted substance, an alumina substance, a microporous mineral, granite porphyry, quartz porphyry, Bakuhan-seki, heal stone, Iou-seki, and Kihou-seki.

Preferably, the functional material is an antibacterial substance or a substance for sterilization.

Preferably, the functional material is a ceramic powder containing silver ions, and the shaped article is used for an antibacterial purpose or for sterilization.

Preferably, the functional material is tourmaline, and the shaped article is used as a detergent aid.

BRIEF DESCRIPTION OF THE DRAWING

Other objects, features, and characteristics of the present invention will become apparent upon consideration of the following description and the appended claims with reference to the accompanying drawings, all of which form a part of the specification, and wherein reference numerals designate corresponding parts in the various figures, wherein:

DETAILED DESCRIPTION OF PREFERRED EMBODIMENTS

Figure 1:
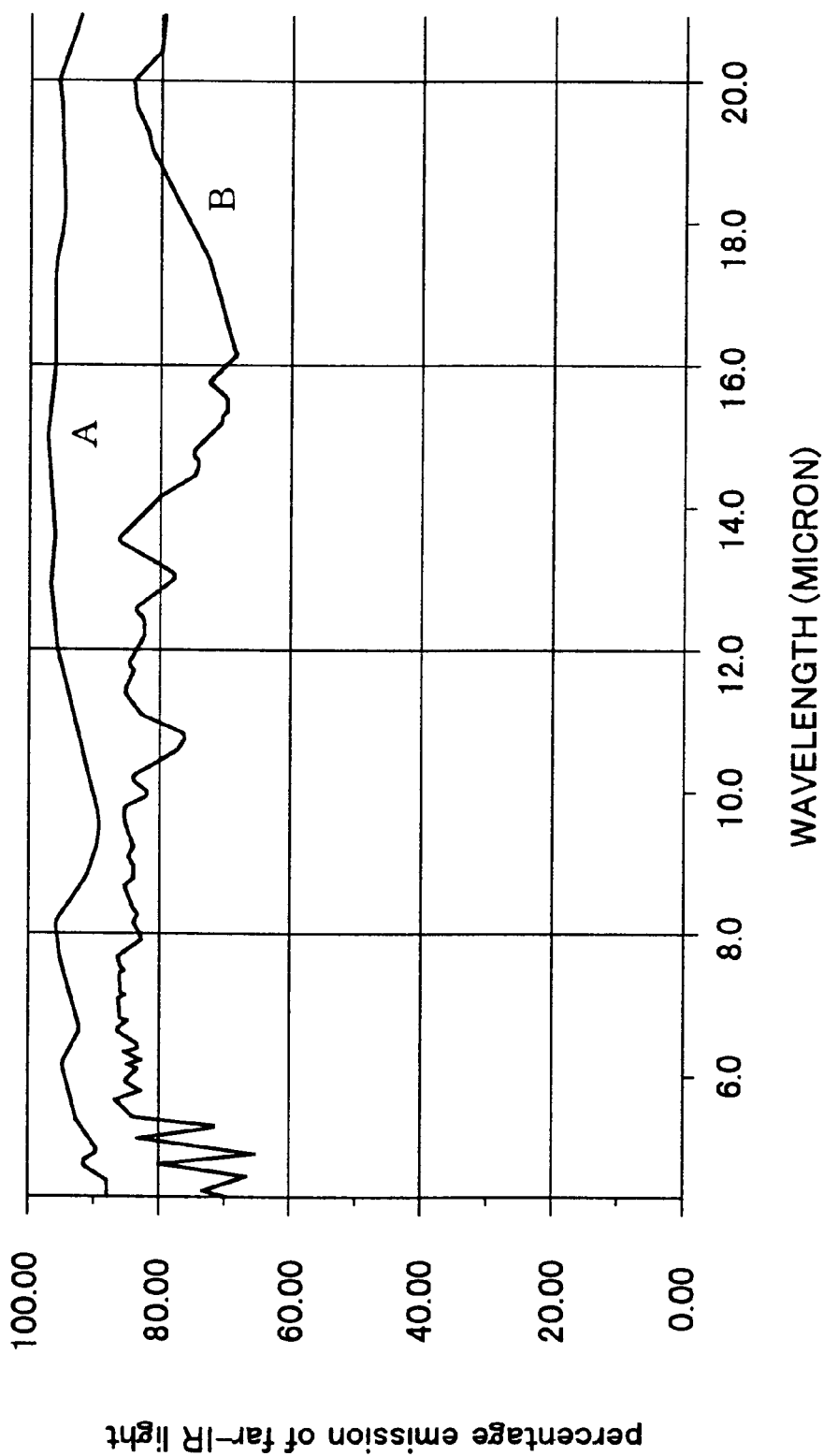
FIG. 1 is a graph showing the percentage far-IR emission for cases (A) and (B), wherein case (A) is drawn to the present invention in which a far-IR-radiating ceramic composition is used and case (B) is drawn to a conventional art in which a polyester resin is used in place of the far-IR-radiating ceramic composition.

The present invention will next be described in detail by way of examples, which should not be construed as limiting the invention thereto, in that a variety of functional materials can be employed in a wide range of amounts.

Water is a very important component among the predominant components constituting the human body, animals, and plants. When water is subjected to an electromagnetic wave having a wavelength corresponding to a resonance wavelength for vibration of the water molecule, water molecules are activated to thereby stimulate cells to exhibit enhanced antibacterial action. Far IR light is well absorbed in water or oil, inter alia, far IR light of wavelengths of 3, 6, and 8–30 $\mu$m is selectively absorbed in water, to thereby vigorously activate water molecules. However, radiation of far IR light having a wavelength of approximately 3 $\mu$m may be negligible in that the beam is not radiated from a black body at room temperature. In water, approximately 20 water molecules-associate to form a cluster. When the cluster absorbs far IR light, resonance of vibration of water molecules reduces the association degree of such a cluster, to thereby enhance mobility of water molecules. Therefore, the thus-treated water easily enters microcavities where non-treated water cannot enter, and easily removes matter adhering on a surface. Thus, far IR light provides a remarkably favorable effect on organisms via water or oil.

In recent years, there has been increased demand for functions required in everyday life, such as radiation of negative ions to air, negatively polarized water, an antibacterial effect, a deodorizing effect based on adsorption, and improvement in flavor and taste of drinking water. In order to meet such demand, specific minerals, inorganic compounds, and fine metallic powders have been made available for respective purposes. Examples of the above materials include quartz-schist, monazite, and tourmaline serving as negative ion-radiating materials; a piezoelectric substance, tourmaline, quartz-schist, and monazite to obtain negatively charged water and negative microelectrodes; silver ion-substituted zeolite, silver microparticles, copper- or zinc-ion-substituting ion-exchangers, and a piezoelectric substance exhibiting an antibacterial effect on water; alumina group minerals having a large surface area and microporous minerals such as a piezoelectric substance and monazite; and mineral-releasing stones such as granite porphyry, quartz porphyry, Bakuhan-seki, heal stone, Iou-seki, and Kihou-seki for-improved flavor and taste of drinking water. These materials are commercially available and may be used on the basis of the characteristics thereof. However, in everyday life, water is significant, and an effect of moisture is also significant in air. Therefore, when the above-described functional materials are used in the-presence of a material radiating far-IR light, functions provided by the materials are synergistically enhanced. In general, in view of stability and convenience, functional materials and minerals are preferably used in the form of balls or plates rather than in the form of crushed chips or powder. A far-IR-radiating ceramic composition containing 52.5–70 wt % $SiO_2$, 20–47 wt % $Al_2O_3$, and 3 wt % or less an Fe component as disclosed in the above-described patent has excellent formability and can advantageously be sintered within a wide range of firing temperatures; specifically, 800–1200° C. The fired composition is kneaded with a functional material or a mineral powder and water, and the mixture is shaped and fired to thereby easily produce a plate-like or a ball-like shaped article. When the ceramic composition is used in combination with a functional material such as a piezoelectric substance or tourmaline which undergoes unfavorable transformation of an effective mineral structure during firing at 900° C. or higher, the composition is selected such that the mixture can be fired lower than 900° C., expecially at 800° C.

The amount of a functional material, metal, or ion-deposited ceramic which is added to the above-described far-IR-radiating ceramic powder varies in accordance with the target function and costs. For example, silver microparticles providing an antibacterial property are added in an amount of approximately 1 wt %, whereas at least one of a piezoelectric substance, tourmaline, granite porphyry, quartz porphyry, Bakuhan-seki, heal stone, and Iou-seki is added in an amount of 50 wt %. The amount is selected in accordance with the intended synergetic effect, ease of shaping, and costs. When the amount is 30 wt % or less, the effect of addition is not attained. Thus, the above described far-IR-radiating ceramic is preferably used in an amount of 30 wt % or more. The effect of far-IR radiation is developed via water, and the content of $Fe_2O_3$ which possibly causes an exothermic side reaction is negligible in the above-described ceramic composition.

Plastic materials such as polyvinyl chloride and polyester are widely used as forming agents for a functional material, metal, or ion-deposited ceramic powder. However, as described below, they provide poor effect for the purposes of the present invention.

EXAMPLE 1

A powder of an antibacterial ceramic containing silver ions was prepared through ion-exchange. The powder (20 wt %) and a clay powder containing $SiO_2$ (56 wt %) and $Al_2O_3$ (38 wt %) serving as a far-IR-radiating ceramic (approximately 80 wt %) were kneaded with water, and the mixture was shaped into 5-mmφ balls, which were-subsequently dried and fired at 850° C. or lower, to thereby produce antibacterial balls. The antibacterial property of the balls were evaluated on the basis of the results of measurement carried out by an authorized public organization. When the antibacterial balls were added in an amount of 1 wt % to bacteria-containing water, *Escherichia coli*, Staphylococcus, and Legionella populations decreased 1/2000–1/10000 of their initial numbers after 6 hours. For comparison, the above antibacterial ceramic powder (20 wt %) was kneaded with polyester resin, the mixture was shaped into 5-mmφ balls, and the balls for comparison were added in an amount of 1 wt % to the above bacteria-containing water. The bacteria populations did not decrease 1/2000–1/10000 of their initial numbers until 24 hours had elapsed. The percentage emission of far-IR light in the case in which a polyester resin was used was approximately 65 wt % at a wavelength of 6 μm and approximately 80 wt % at a wavelength of 8–18 μm. The results are shown in FIG. 1.

EXAMPLE 2

The powder far-IR-radiating ceramic powder used in Example 1 (approximately 70 wt %), tourmaline powder (approximately 30 wt %), and low-melting cement powder (small amount) were kneaded with water, and the mixture was shaped into 5-mmφ balls, which were subsequently dried and fired at 800° C., to thereby produce tourmaline balls. The tourmaline balls (200 g) were placed in a net bag, which was subsequently placed-in-an electric washing machine. A standard soiled cloth was washed by use of detergent in the machine. Ten minutes of washing sufficiently removed the soil. The effect was still confirmed even when the amount of detergent was made half the original amount. For comparison, the tourmaline powder (approximately 30 wt %) was kneaded with a polyester resin, and the mixture was injection-molded into 5-mmφ balls. By use of the tourmaline balls (200 g), the same washing test was performed. Performance in removing soil was deteriorated by about 30 wt %, as determined by measurement of reflectivity of the cloth surface.

As described herein above, the present invention provides a shaped article of a functional material in which an effect of a functional material is synergetically enhanced by far-IR light energy at room temperature. The articles are obtained through mixing the functional material with a far-IR-radiating ceramic powder for ensuring good formability, and shaping the mixture. The articles are useful for providing a synergetic effect of a functional material such as a metallic powder, an ion-containing material, or a mineral in the presence of water or oil. The effect is provided by radiation of far IR light of wavelengths of 3, 6, and 8–30 μm, especially 8"14 μm, at which water molecules undergo resonance of vibration at ambient temperature.

While the invention has been described in connection with what are presently considered to be the most practical and preferred embodiments, it is to be understood that the invention is not to be limited to the disclosed embodiments, but on the contrary, the description is intended to cover various modifications and equivalent arrangements included within the spirit and scope of the appended claims. The present document claims the benefit of Japanese priority document, filed in Japan on Oct. 23, 1998, the entire contents of which is incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed is:

1. A function-enhanced shaped ceramic article, obtained by mixing
   1) a powder of a functional material of at least one species selected from the group consisting of a mineral, a metal, and a metallic compound, and
   2) a powder of a far-infrared-radiating material comprising a ceramic composition containing 52.5–70 wt % $SiO_2$ and 20–47 wt % $Al_2O_3$;
   shaping the mixture; and
   firing.

2. The function-enhanced shaped ceramic article according to claim 1, wherein an amount of the powder of a far-infrared-radiating material is at least 30 wt % by weight.

3. The function-enhanced shaped ceramic article according to claim 1, wherein an amount of the powder of a far-infrared-radiating material is at least 30 wt % by weight and not more than 90 wt % by weight.

4. The function-enhanced shaped ceramic article according to claim 1, wherein the functional material comprises at least one species selected from the group consisting of quartz-schist, monazite, tourmaline, a silver-ion-exchanged substance, a silver microparticle, a copper-ion-exchanged substance, a zinc-ion-exchanged substance, γ-alumina, a microporous mineral, granite porphyry, quartz porphyry, Bakuhan-stone, Banded chert, and Kihou-stone.

5. The function-enhanced shaped ceramic article according to claim 2, wherein the functional material comprises at least one species selected from the group consisting of quartz-schist, monazite, tourmaline, a silver-ion-exchanged substance, a silver microparticle, a copper-ion-exchanged substance, a zinc-ion-exchanged substance, γ-alumina, a microporous mineral, granite porphyry, quartz porphyry, Bakuhan-stone, Banded chert, and Kihou-stone.

6. The function-enhanced shaped ceramic article according to claim 1, wherein the functional material is an antibacterial substance or a substance for sterilization.

7. The function-enhanced shaped ceramic article according to claim 2, wherein the functional material is an antibacterial substance or a substance for sterilization.

8. The function-enhanced shaped ceramic article according to claim 1, wherein the functional material is a ceramic powder containing silver ions, and the shaped article is used for an antibacterial purpose or sterilization.

9. The function-enhanced shaped ceramic article according to claim 2, wherein the functional material is a ceramic powder containing silver ions, and the shaped article is used for an antibacterial purpose or sterilization.

10. The function-enhanced shaped ceramic article according to claim 1, wherein the functional material is tourmaline, and the shaped article is used as an antibacterial material or a material for sterilization.

11. The function-enhanced shaped ceramic article according to claim 1, wherein the functional material is tourmaline, and the shaped article is used as a detergent aid.

12. The function-enhanced shaped ceramic article according to claim 1, wherein said firing occurs at a temperature of from 800 to 1200° C.

13. The function-enhanced shaped ceramic article according to claim 1, wherein said firing occurs at a temperature below 900° C.

14. The function-enhanced shaped ceramic article according to claim 1, wherein said functional material is a piezoelectric substance.

15. The function-enhanced shaped ceramic article according to claim 2, wherein said functional material is a piezoelectric substance.

\* \* \* \* \*